US010090728B2

(12) United States Patent
Mitsumizo et al.

(10) Patent No.: US 10,090,728 B2
(45) Date of Patent: Oct. 2, 2018

(54) GEARBOX, MOTOR WITH SPEED REDUCER, AND METHOD FOR MANUFACTURING GEARBOX

(71) Applicant: Mabuchi Motor Co., Ltd., Matsudo (JP)

(72) Inventors: Takao Mitsumizo, Matsudo (JP); Yuuki Hirano, Matsudo (JP); Toshiya Yuhi, Matusdo (JP); Hiroki Kouno, Matsudo (JP); Satoshi Kikuchi, Matsudo (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 10 days.

(21) Appl. No.: 15/356,443

(22) Filed: Nov. 18, 2016

(65) Prior Publication Data

US 2017/0070121 A1     Mar. 9, 2017

Related U.S. Application Data

(63) Continuation of application No. PCT/JP2015/064071, filed on May 15, 2015.

(30) Foreign Application Priority Data

Jun. 10, 2014  (JP) .................................. 2014-119855

(51) Int. Cl.
*H02K 5/22*       (2006.01)
*H02K 15/14*      (2006.01)
(Continued)

(52) U.S. Cl.
CPC .............. *H02K 5/225* (2013.01); *H02K 5/02* (2013.01); *H02K 7/1166* (2013.01);
(Continued)

(58) Field of Classification Search
CPC ...... H02K 15/0062; H02K 15/14; H02K 5/02; H02K 5/225; H02K 7/1166; H02K 15/12; H02K 7/116
(Continued)

(56) References Cited

U.S. PATENT DOCUMENTS 6,573,625 B2 *  6/2003  Shimizu .................. H02K 5/10
                                                310/239
2003/0102767 A1 *  6/2003  Adachi .................... H02K 5/10
                                                310/239
(Continued)

FOREIGN PATENT DOCUMENTS

JP       2001-128407 A      5/2001
JP       2001-268841 A      9/2001
(Continued)

OTHER PUBLICATIONS

Translation of foreign Patent Document JP 2001268841 A (Year: 2001).*
(Continued)

*Primary Examiner* — Alex W Mok
(74) *Attorney, Agent, or Firm* — Schwabe Williamson & Wyatt, PC

(57) ABSTRACT

A gearbox includes: a gearbox main body made of resin that constitutes a part of a speed reducer to which a motor is mounted; and a terminal that conducts power supplied from an external source to the motor. The gearbox main body includes a through hole formed to correspond to a mold that is used to maintain a position of the terminal while the terminal is being integrated with the gearbox main body by insert molding. The through hole may function as a vent hole in the gearbox main body.

10 Claims, 16 Drawing Sheets

(51) Int. Cl.
*H02K 15/00* (2006.01)
*H02K 5/02* (2006.01)
*H02K 7/116* (2006.01)
*H02K 15/12* (2006.01)

(52) U.S. Cl.
CPC ......... *H02K 15/0062* (2013.01); *H02K 15/12* (2013.01); *H02K 15/14* (2013.01)

(58) Field of Classification Search
USPC .................................................. 310/43, 71
See application file for complete search history.

(56) References Cited

U.S. PATENT DOCUMENTS

| | | | | |
|---|---|---|---|---|
| 2006/0244321 | A1* | 11/2006 | Mizutani | H01R 39/383 310/68 R |
| 2009/0146510 | A1* | 6/2009 | Uchimura | H02K 7/1166 310/71 |
| 2011/0057526 | A1* | 3/2011 | Kokubu | H02K 5/148 310/83 |
| 2013/0285492 | A1* | 10/2013 | Ozaki | H02K 11/0084 310/71 |
| 2014/0132095 | A1* | 5/2014 | Aoki | H02K 7/116 310/71 |

FOREIGN PATENT DOCUMENTS

| | | |
|---|---|---|
| JP | 2003-153498 A | 5/2003 |
| JP | 2012-139079 A | 7/2012 |

OTHER PUBLICATIONS

Notice of Reasons for Refusal for Japanese Patent Application No. 2014-119855, dated Aug. 22, 2017; 5 pages including English translation.
International Preliminary Report on Patentability for PCT/JP2015/064071 dated Dec. 15, 2016; 5 pages; with English translation—total 10 pages.
International Search Report for PCT/JP2015/064071 dated Jun. 16, 2015; 3 page; with English translation—total 4 pages.
The State Intellectual Property Office of People's Republic of China for CN App. No. 201580024180.X dated Jun. 26, 2018; 10 pages including English translation.

* cited by examiner 40  42

44

48

GEARBOX, MOTOR WITH SPEED REDUCER, AND METHOD FOR MANUFACTURING GEARBOX

This application is based upon and claims the benefit of priority from the prior Japanese Patent Application No. 2014-119855, filed on Jun. 10, 2014, and International Patent Application No. PCT/JP/2015/064071, filed on May 15, 2015, the entire content of each of which is incorporated herein by reference.

BACKGROUND OF THE INVENTION

1. Field of the Invention

The present invention relates to a gearbox and, more particularly, a gearbox used in a speed reducer for a motor.

2. Description of the Related Art

In the related art, small DC motors are used in automobile electrical apparatuses such as power window apparatuses for opening or closing a power window, automobile door locking and unlocking apparatuses, electrically-driven mirror driving and storage apparatuses, and air conditioning apparatuses, and in a variety of other apparatuses. In these apparatuses, a motor unit in which a motor is integrated with a speed reducer for adjusting the torque or revolving speed is used.

For example, a motor with a speed reducer is devised which is used as a driving source in a power window apparatus mounted to a vehicle (see the patent document). In this motor, a brush holder is fitted and fixed to the opening of the yoke housing. The brush holder is configured such that a holder main body for holding a pair of brushes and a connector unit (power feeding connector) coupled to the holder main body via a joint are integrated. A power feeding terminal is integrally provided in the brush holder by insert molding.

RELATED ART DOCUMENT

[patent document 1] JP2003-153498

The motor described above includes a resin brush holder in which the terminal is formed by insert molding. The connector is a component separate from the gear housing. As a result, the number of components and assembly steps is increased.

SUMMARY OF THE INVENTION

The embodiments of the present invention address the issue and a purpose thereof is to provide a gearbox with a novel structure.

The gearbox according to an embodiment of the present invention includes: a gearbox main body made of resin that constitutes a part of a speed reducer to which a motor is mounted; and a terminal that conducts power supplied from an external source to the motor. The gearbox main body includes a through hole formed to correspond to a mold that is used to maintain a position of the terminal while the terminal is being integrated with the gearbox main body by insert molding.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
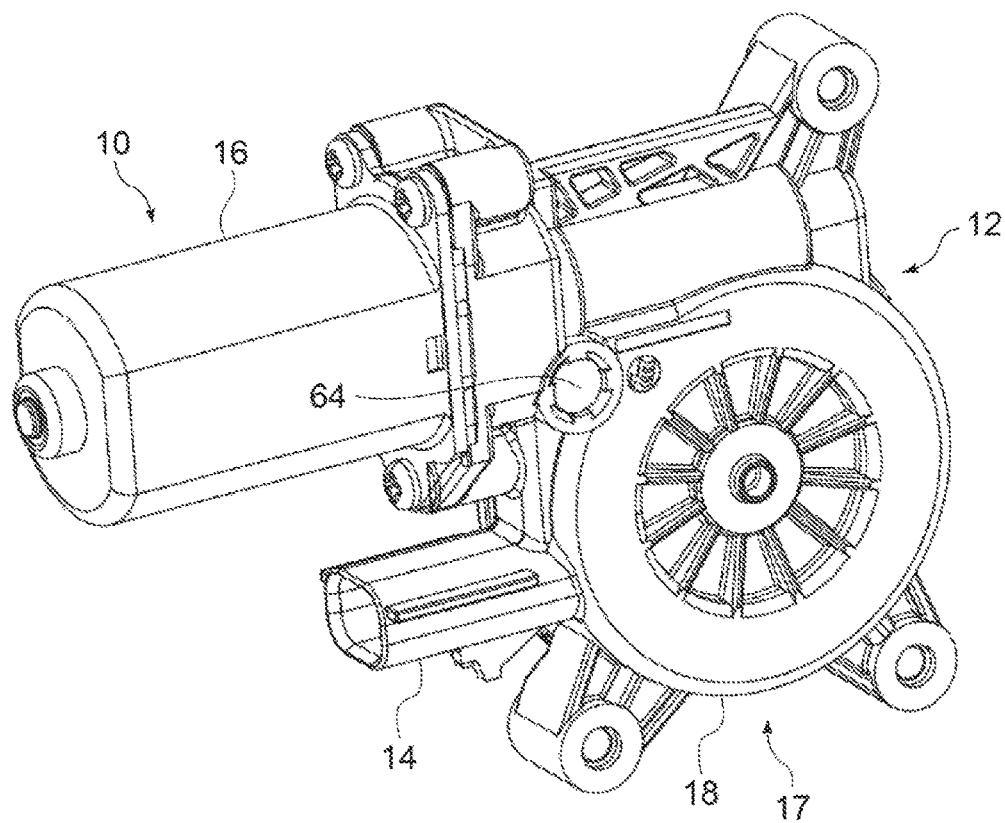
FIG. 1 is a perspective view of a DC motor with a speed reducer according to an embodiment of the present invention.

The gearbox according to an embodiment of the present invention includes: a gearbox main body made of resin that constitutes a part of a speed reducer to which a motor is mounted; and a terminal that conducts power supplied from an external source to the motor. The gearbox main body includes a through hole formed to correspond to a mold that is used to maintain a position of the terminal while the terminal is being integrated with the gearbox main body by insert molding.

According to the embodiment, the precision of position of the terminal relative to the gearbox is improved. Because the through hole is formed by using a mold for supporting the terminal, a gearbox with a novel structure results.

The through hole may function as a vent hole in the gearbox main body. This eliminates a pressure difference between the interior and exterior of the gearbox.

The gearbox may include: a worm wheel housing that houses a worm wheel of the speed reducer; a motor mount formed with an opening through which a worm fixed to a motor shaft is inserted and having the motor mounted thereto; and a power feeding opening to which an external terminal is connected. The terminal constitutes a power feeding channel between the motor mount and the power feeding opening, and the through hole is provided in a region adjacent to the motor mount and at a position where a difference in a pressure inside the motor mount and a pressure outside the motor is eliminated. This makes it possible to eliminate a pressure difference from a space outside the motor even in a situation in which a negative pressure develops inside the motor when the motor is stopped and is gradually cooled.

The through hole may be provided at a position where a space isolated from the worm wheel housing by a partition wall and formed by removing a mold member used to support the terminal and a space outside the motor communicate. For example, this prevents the lubricant filling the worm wheel housing from contaminating the terminal.

The gearbox may further include a semipermeable membrane provided to cover the through hole. The through hole may be polygonal, an annular concave part may be formed around the through hole to face the front, and the semipermeable membrane may be mounted to the concave part. This reduces wrinkles formed when the circular semipermeable membrane is welded to the concave part.

The terminal may include a first terminal and a second terminal. The through hole may be formed to correspond to a mold member used to maintain positions of the first terminal and the second terminal. This allows the two terminals to be positioned by using a common mold member.

The gearbox may be configured such that a minimum distance between the through hole and the terminal is 0.5 mm or less when the gearbox main body is seen in an axial direction of a rotation axis of the worm wheel. This ensures high precision of the position of the terminals formed in the gearbox main body by insert molding.

Another embodiment of the present invention relates to a motor with a speed reducer. The motor with a speed reducer includes a gearbox; a worm wheel; and a motor in which a worm in mesh with the worm wheel is fixed to a shaft.

Still another embodiment relates to a method of manufacturing a gearbox. The method manufactures a gearbox main body of a speed reducer to which a motor is mounted by integral molding, using a mold, wherein a terminal for establishing electric conduction between two openings of the gearbox main body is integrated with the gearbox main body by insert molding such that the terminal is sandwiched and fixed by a plurality of molds.

This embodiment eliminates an extra step of arranging a terminal in the gearbox so that the manufacturing process is simplified. It also prevents the terminal from being lifted by the resin that flows during insert molding.

A vent hole may be formed to correspond to one of the plurality of molds. This allows the terminal to be positioned and the vent hole to be formed, by using a common mold.

The plurality of molds may include a mount mold for mounting the terminal and a housing mold for forming a side wall of a worm wheel housing for housing a worm wheel of the speed reducer. The terminal may be insert molded so that terminal mounted to the mount mold is not in contact with a part of the housing mold that corresponds to the worm wheel housing. This prevents the terminal from being exposed inside the worm wheel housing so that the water proof and insulation performance is improved. It also prevents the lubricant filling the worm wheel housing from contaminating the terminal.

Optional combinations of the aforementioned constituting elements, and implementations of the invention in the form of methods, apparatuses, and systems may also be practiced as additional modes of the present invention.

The gearbox according to an embodiment of the present invention is used in a speed reducer for a variety of motors. The resultant motor with a speed reducer is suitably used in automobile electrical apparatus such as a vehicle power window system, a sun roof, a power seat, and a door closure.

As described above, a component integrated with a resin component can be manufactured by forming the terminal by insert molding. By manufacturing a gearbox main body such that the terminal is integrated by insert molding, components such as the brush holder described above can be eliminated. More specifically, a structure is conceivable in which the terminal that serves as a power feed channel from the connector to the motor is provided inside the gearbox. In this case, the terminal may be displaced from a predetermined position as the resin flows during insert molding unless the terminal is firmly fixed in the mold. Displacement of the terminal inside the gearbox main body affects the amount of projection of the terminal end at the power feeding opening to which an external terminal is connected. In some cases, the required precision for dimension may not be met.

Meanwhile, a structure for supporting the terminal inside the mold requires formation of a space corresponding to the supporting structure in the gearbox main body. Therefore, a comprehensive evaluation is needed to determine which part of the mold should support the terminal by allowing for the shape of the gearbox main body. A description will now be given of an aspect of the embodiment in which the space formed by a part of the mold that has supported the terminals during the molding process is used as a through hole that extends through the interior and exterior of the gearbox main body.

A description will be given of an embodiment of the present invention with reference to the drawings. Like numerals represent like elements so that the description will be omitted accordingly. The structure described below is by way of example only and does not limit the scope of the invention.

Motor with a Speed Reducer

FIG. 1 is a perspective view of a DC motor 100 with a speed reducer according to an embodiment of the present invention. The DC motor 100 with a speed reducer includes a motor 10 and a speed reducer 12 coupled to the shaft of the motor 10. The motor 10 includes a cylindrical housing 16. The speed reducer 12 includes a worm wheel, a worm, and a gearbox 17 that houses the worm wheel and the worm. The gearbox 17 includes a cylindrical gearbox main body 18 and a cover. A connector 14 for feeding power from outside is provided in the gearbox main body 18 by integral molding.

Gearbox

Figure 2:
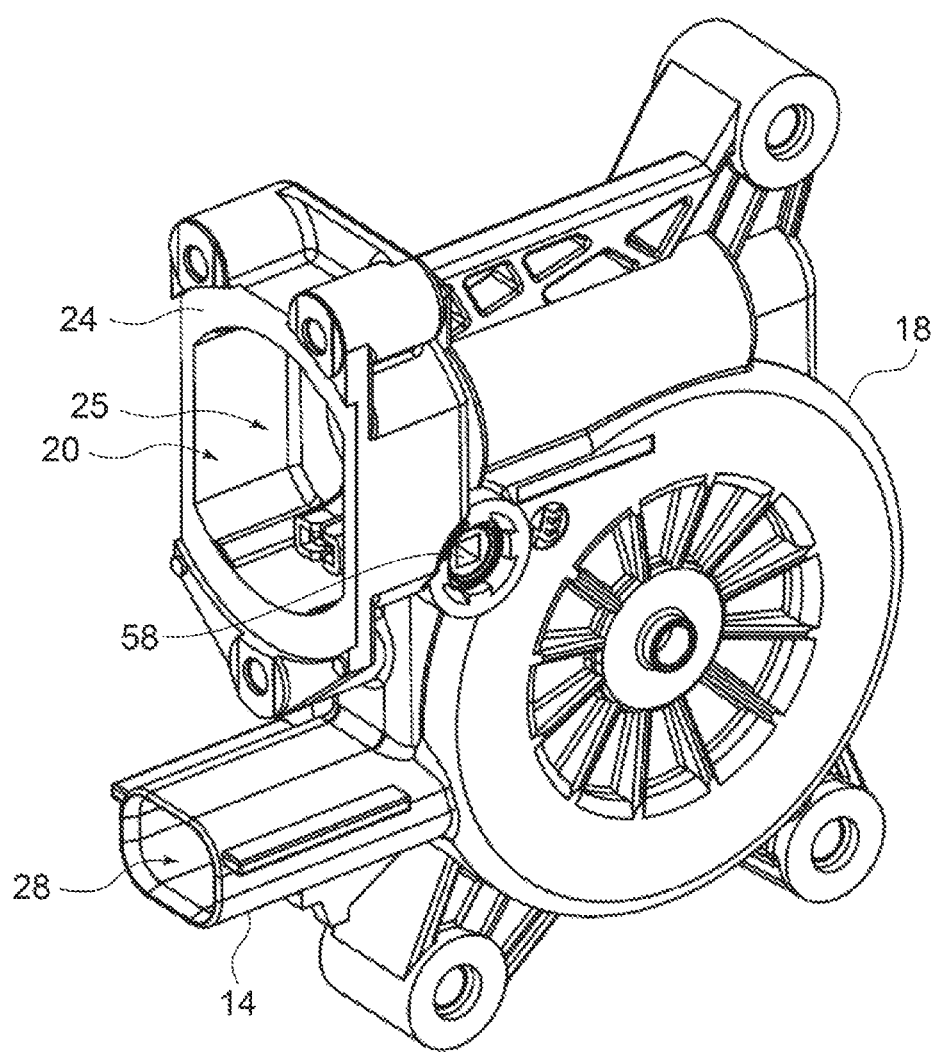
FIG. 2 is a perspective view of a gearbox according to the embodiment.
Figure 3:
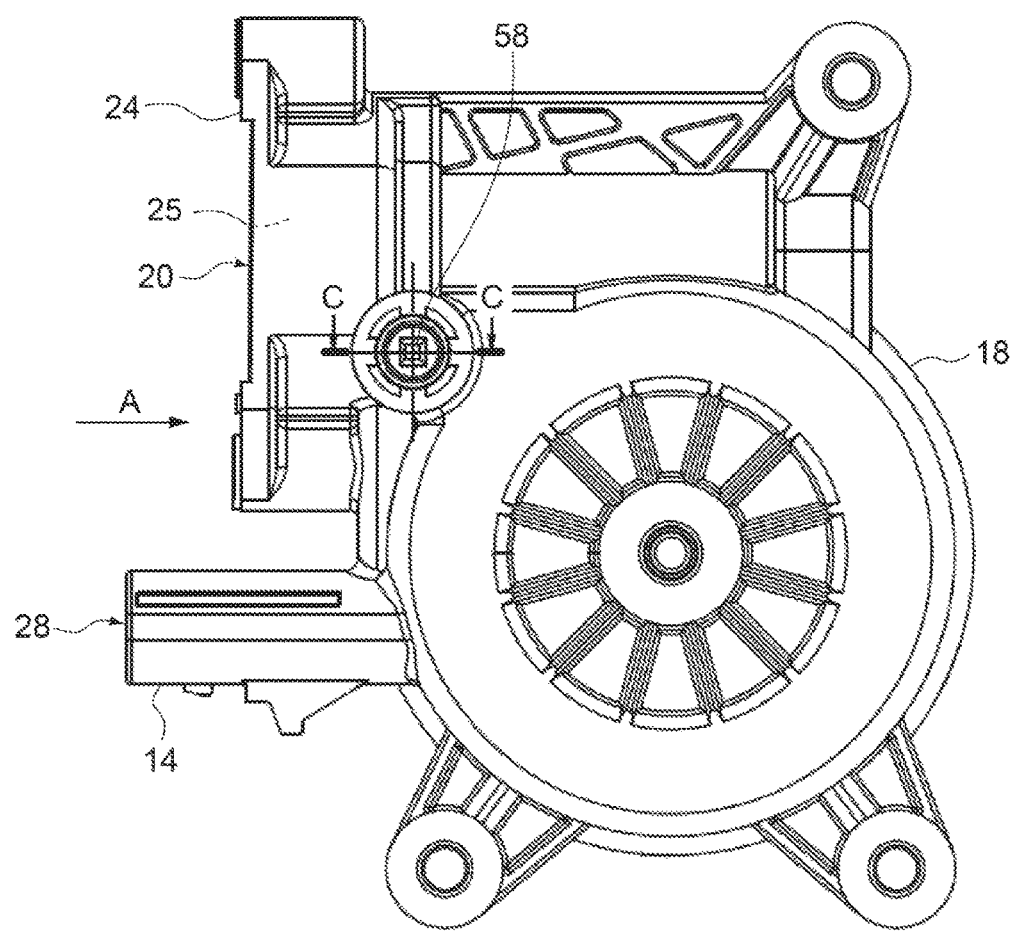
FIG. 3 is a front view of the gearbox according to the embodiment.
Figure 4:
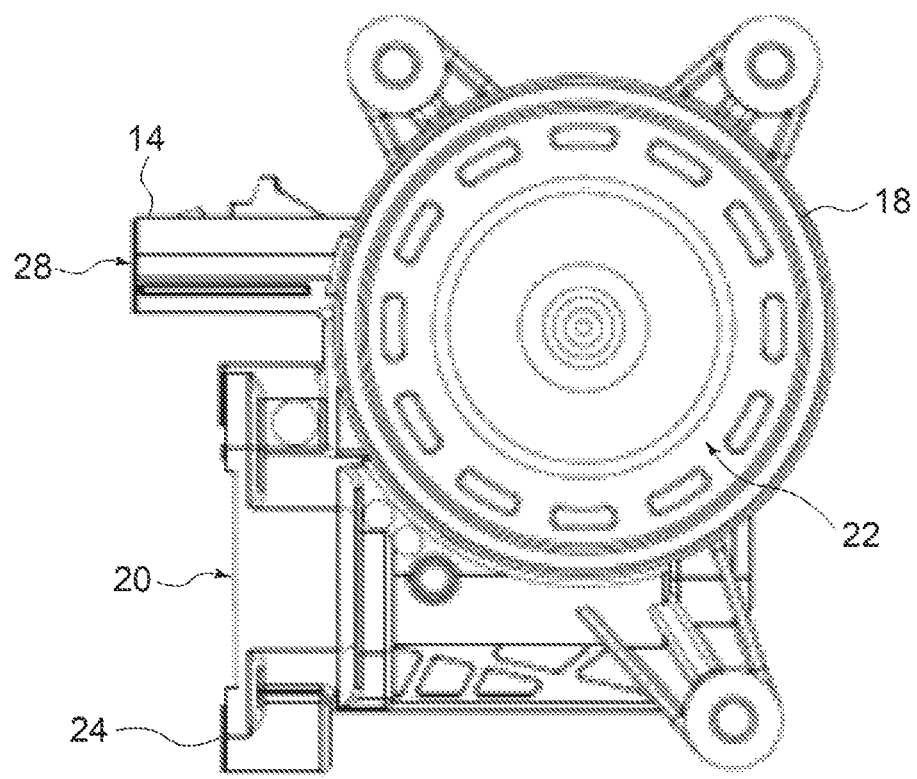
FIG. 4 is a rear view of the gearbox according to the embodiment.

FIG. 2 is a perspective view of the gearbox according to the embodiment. FIG. 3 is a front view of the gearbox according to the embodiment. FIG. 4 is a rear view of the gearbox according to the embodiment.

The gearbox 17 includes a gearbox main body 18 made of resin that constitutes a part of the speed reducer 12 to which the motor 10 is mounted. The gearbox main body 18 includes a worm wheel housing 22 for housing the worm wheel of the speed reducer 12, and a motor mount 24 formed with an opening 20 through which the worm fixed to the motor shaft is inserted and having the motor mounted thereto. The worm is configured to be in mesh with the worm wheel.

The gearbox main body 18 includes a power feeding opening 28 to which the external terminal is connected. As shown in FIGS. 2 through 4, the opening 20 of the motor mount 24 and the power feeding opening 28 are integrally formed on the same side on the surface of the gearbox main body 18. This facilitates the job of mounting the motor or the external terminal to the gearbox. As compared to the case where the opening 20 and the power feeding opening 28 are provided on the opposite sides across the gearbox main body 18, the total length of the DC motor 100 with a speed reducer can be reduced.

Insert Terminal

Figure 5:
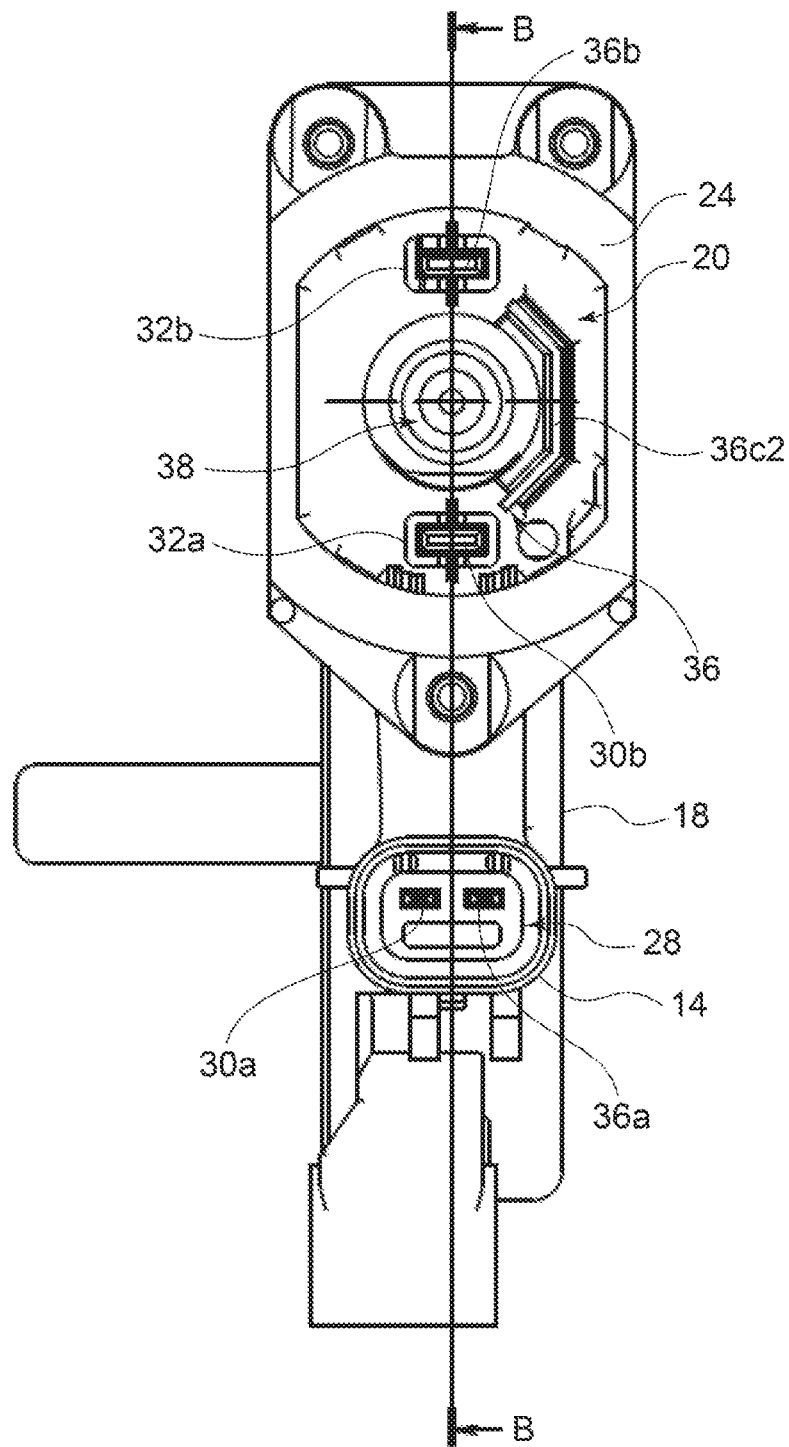
FIG. 5 is a side view of the gearbox shown in FIG. 3 in direction A.
Figure 6:
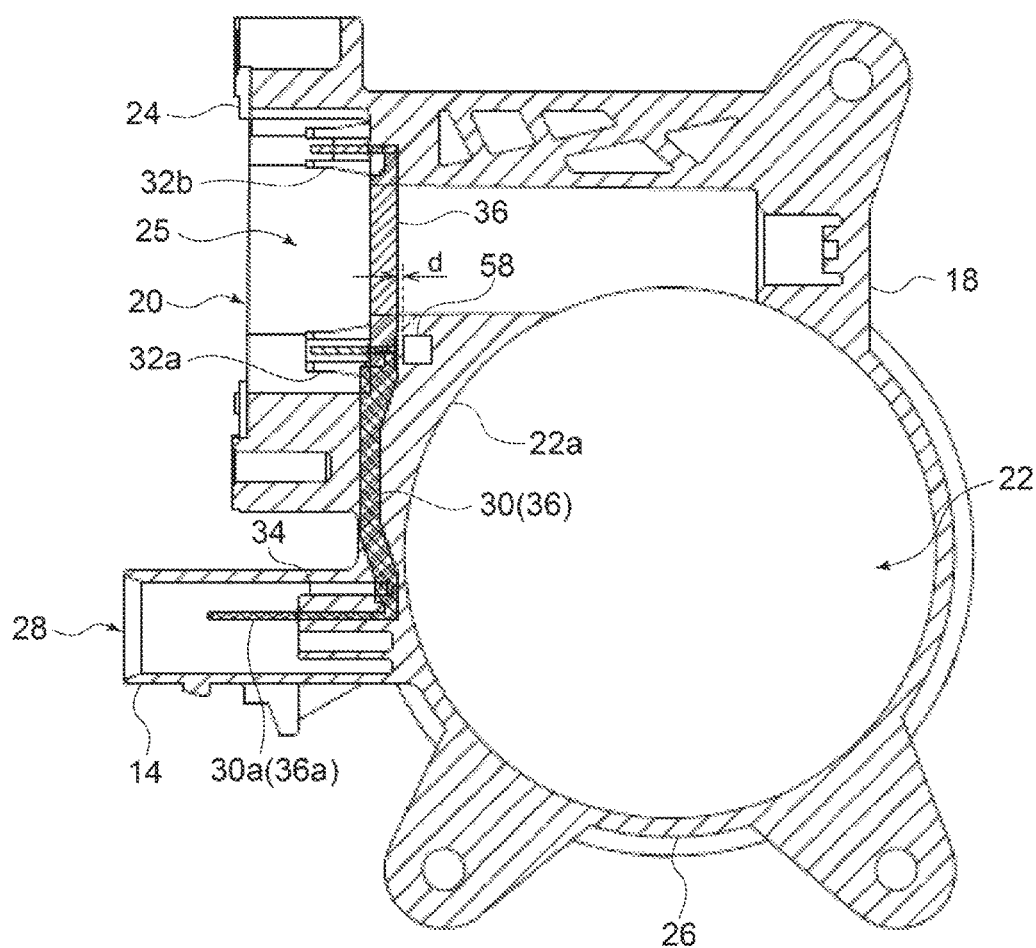
FIG. 6 shows a section B-B of the gearbox shown in FIG. 5.

FIG. 5 is a side view of the gearbox shown in FIG. 3 in direction A, and FIG. 6 shows a section B-B of the gearbox shown in FIG. 5. The gearbox 17 according to the embodiment includes two insert terminals integrated with the gearbox 17 by insert molding when the gearbox is manufactured. As shown in FIG. 6, a first insert terminal 30 is arranged to establish electric conduction from one connection part 32a provided in the opening 20 to a connection part 34 provided in the power feeding opening 28. Further, as shown in FIG. 6, a second insert terminal 36 is arranged to establish electric conduction from another connection part 32b provided in the opening 20 to the connection part 34 provided in the power feeding opening 28. Thus, each insert terminal constitutes a power feeding channel between the motor mount 24 and the power feeding opening 28.

The first insert terminal 30 and the second insert terminal 36 are integrated with the gearbox 17 such that at least a part of the insert terminal is embedded in the gearbox main body 18. Further, each insert terminal is arranged such that an end of the insert terminal is exposed from the opening 20. This eliminates the need for an extra step of providing a terminal after the gearbox is manufactured so that the manufacturing process is simplified. Still further, each insert terminal is arranged such that an end of the insert terminal is exposed from the opening 28. This allows the external terminal to be connected to the insert terminal directly so that there is no need to provide an extra terminal at the power feeding opening.

Figure 7:
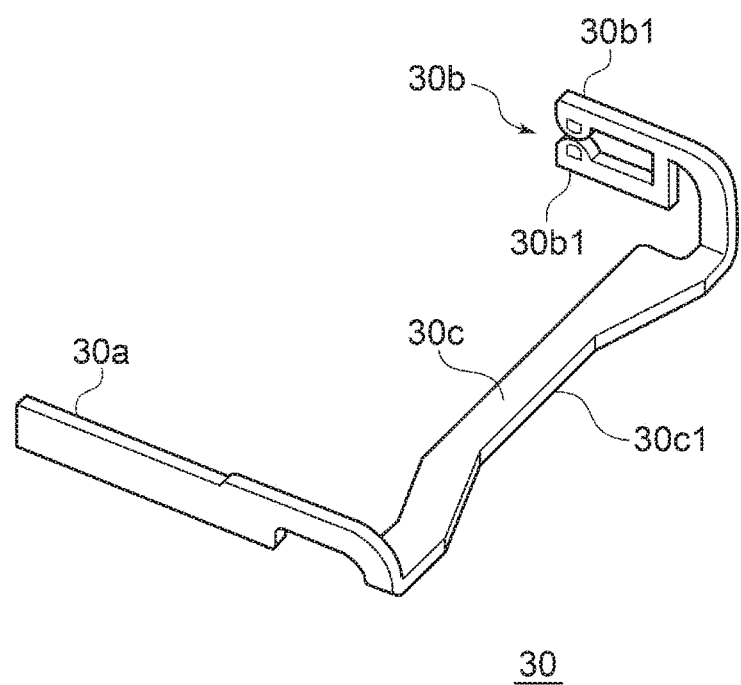
FIG. 7 is a perspective view of the first insert terminal according to the embodiment.

FIG. 7 is a perspective view of the first insert terminal according to the embodiment. The first insert terminal 30 is manufactured by punching a plate-shaped member and plastically deforming a part of the punched member. A highly conductive metal or alloy is used to form the plate-shaped member. For example, copper or brass (alloy of copper and zinc) is suitably used. The first insert terminal 30 is formed, at an end thereof, with a pin 30a that projects in the connection part 34 inside the power feeding opening 28 and, at the other end thereof, with a sandwiching part 30b that projects in the connection part 32a inside the opening 20. The sandwiching part 30b has a pair of arms 30b1. The first insert terminal 30 also includes a connection part 30c that connects the pin 30a and the sandwiching part 30b.

The pin 30a is connected, at the connection part 34, to the external terminal mounted in the power feeding opening 28 for electric conduction with a power supply or a controller, so as to be fed with a signal and power. Further, the sandwiching part 30b sandwiches the terminal of the motor inserted into the opening 20, at the end of the pair of arms 30b1 that project in the connection part 32a. The connection part 30c includes a notch (concave part) 30c1. Instead of the notch 30c1, the connection part 30c may include a curvature.

Figure 8:
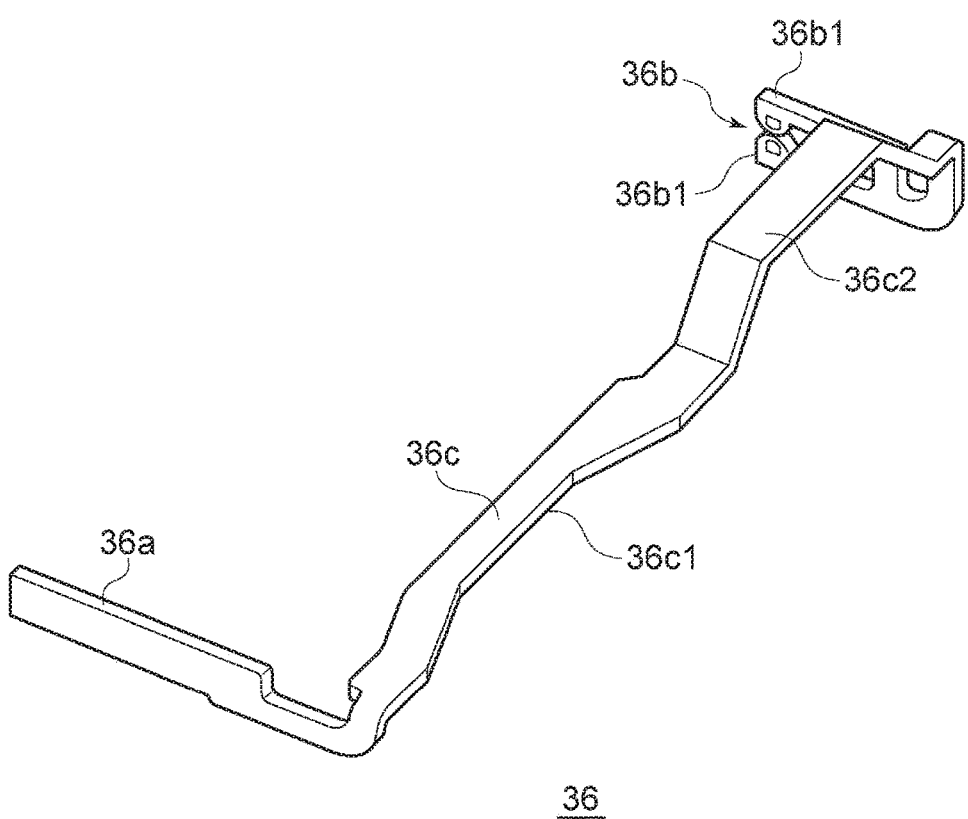
FIG. 8 is a perspective view of the second insert terminal according to the embodiment.

FIG. 8 is a perspective view of the second insert terminal according to the embodiment. The material and the manufacturing method of the second insert terminal 36 are the same as those of the first insert terminal 30. The second insert terminal 36 is formed, at an end thereof, with a pin 36a that projects in the connection part 34 inside the power feeding opening 28 and, at the other end thereof, with a sandwiching part 36b that projects in the connection part 32b inside the opening 20. The sandwiching part 36b has a pair of arms 36b1. The second insert terminal 36 also includes a connection part 36c that connects the pin 36a and the sandwiching part 36b.

The pin 36a is connected, at the connection part 34, to the external terminal mounted in the power feeding opening 28 for electric conduction with a power supply or a controller, so as to be fed with a signal and power. Further, the sandwiching part 36b sandwiches the terminal of the motor inserted into the opening 20, at the end of the pair of arms 36b1 that project in the connection part 32b.

The connection part 36c includes a notch (concave part) 36c1 and a folded part 36c2 folded so as not to cross a worm opening 38 shown in FIG. 5. Instead of the notch 36c1, the connection part 36c may include a curvature.

By providing each terminal with a bypassing part shaped to bypass an inner circumferential wall 22a of the worm wheel housing 22, a motor housing 25, which houses a part of the motor case, and the connection parts 32a, 32b can be provided at positions further inside the gearbox. The arrangement also allows the terminals to be embedded in the gearbox main body 18 so as not to be exposed on the inner circumferential wall 22a of the worm wheel housing 22 so that the water proof and insulation performance is improved.

Method of Manufacturing a Gearbox

An example of suitable method of manufacturing the gearbox according to the embodiment will be described. The gearbox manufacturing method manufactures the gearbox main body of the speed reducer to which the motor is mounted by integral molding, using a mold.

Figure 9A:
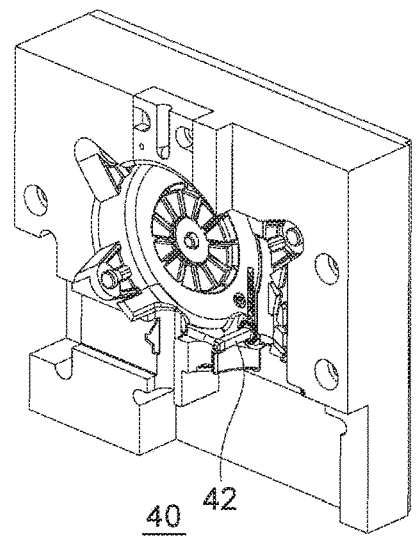
FIG. 9A is a perspective view of a fixed mold that mainly molds the outer circumferential wall (i.e., the outer form) of the cylindrical part of the gearbox main body.
Figure 9B:
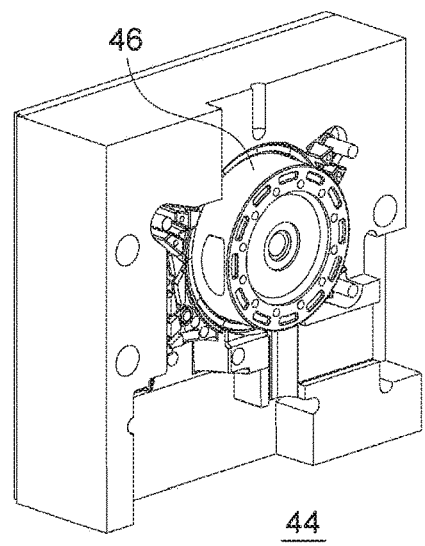
FIG. 9B is a perspective view of a movable mold that mainly molds the worm wheel housing formed by the inner circumferential wall of the cylindrical part of the gearbox main body.
Figure 9C:
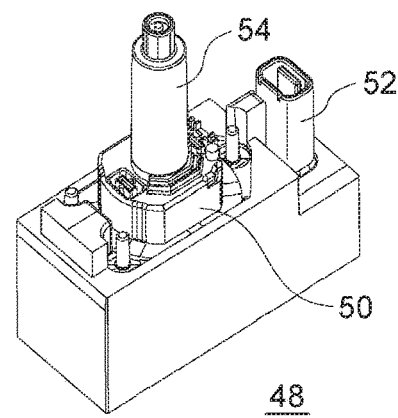
FIG. 9C is a perspective view of a slide mold that mainly molds two openings of the gearbox main body.

FIG. 9A is a perspective view of a fixed mold that mainly molds the outer circumferential wall (i.e., the outer form) of the cylindrical part of the gearbox main body; FIG. 9B is a perspective view of a movable mold that mainly molds the worm wheel housing formed by the inner circumferential wall of the cylindrical part of the gearbox main body; and FIG. 9C is a perspective view of a slide mold that mainly molds two openings of the gearbox main body.

The fixed mold 40 shown in FIG. 9A is provided with a mold pin 42 for supporting the insert terminal. The mold pin 42 is separate from the fixed mold 40 and is configured to be inserted into the fixed mold 40. The function and structure of the mold pin 42 will be described later in details. The movable mold 44 shown in FIG. 9B is provided with a columnar convex part 46 for forming a space corresponding to the worm wheel housing 22 of the worm wheel of the gearbox main body 18. The slide mold 48 shown in FIG. 9C is provided with a convex part 50 and a convex part 52 for forming spaces corresponding to the opening 20 and power feeding opening 28 of the gearbox main body 18. Further, the slide mold 48 is provided with a columnar part 54, on the convex part 50, for forming a space for accommodating the worm fixed to the motor shaft of the motor 10.

Figure 10:
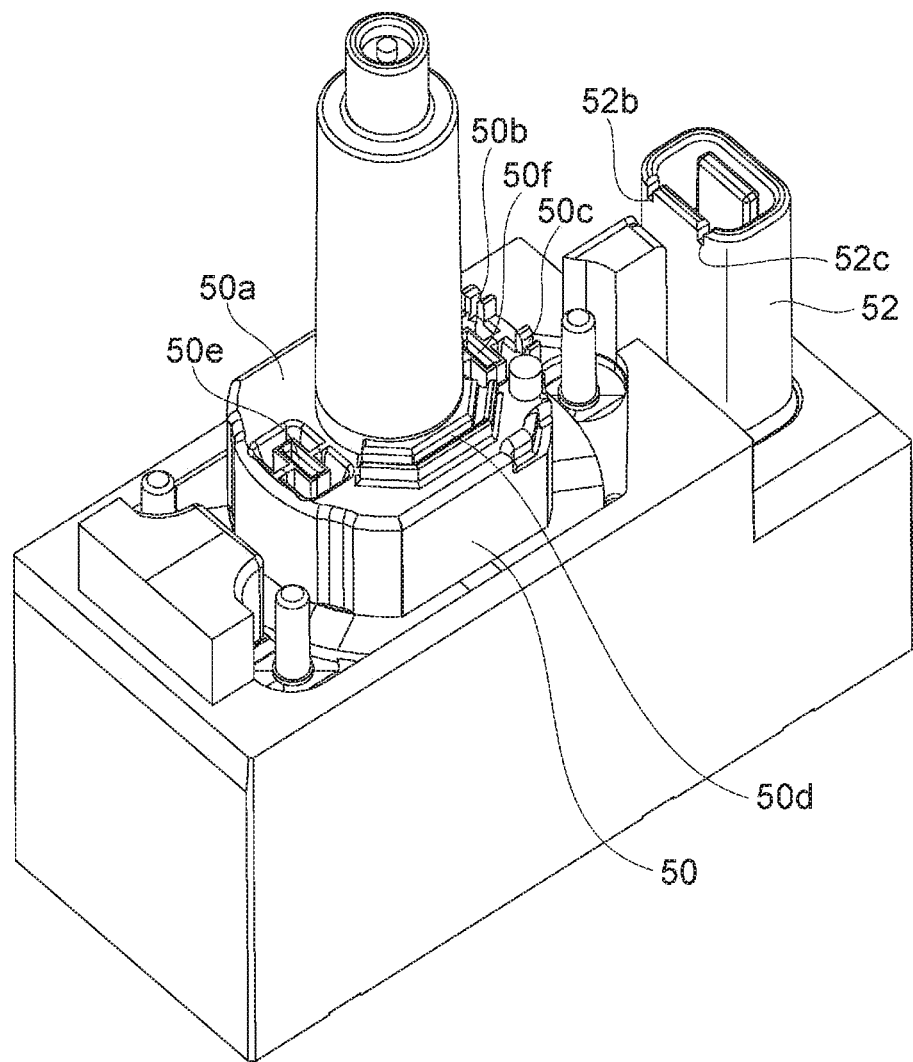
FIG. 10 is a perspective view of the slide mold from above.
Figure 11:
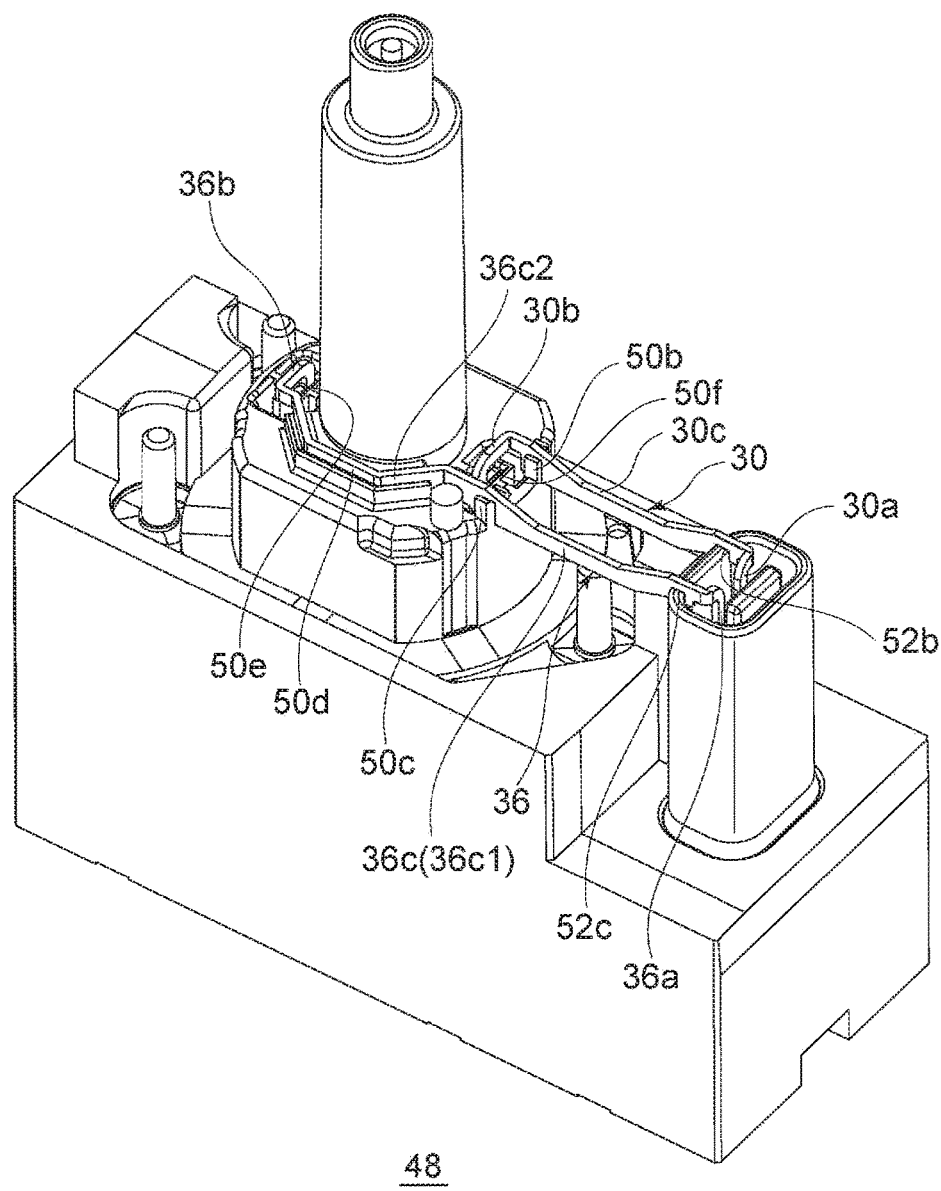
FIG. 11 is a perspective view of the slide mold to which the two insert terminals are mounted.
Figure 12:
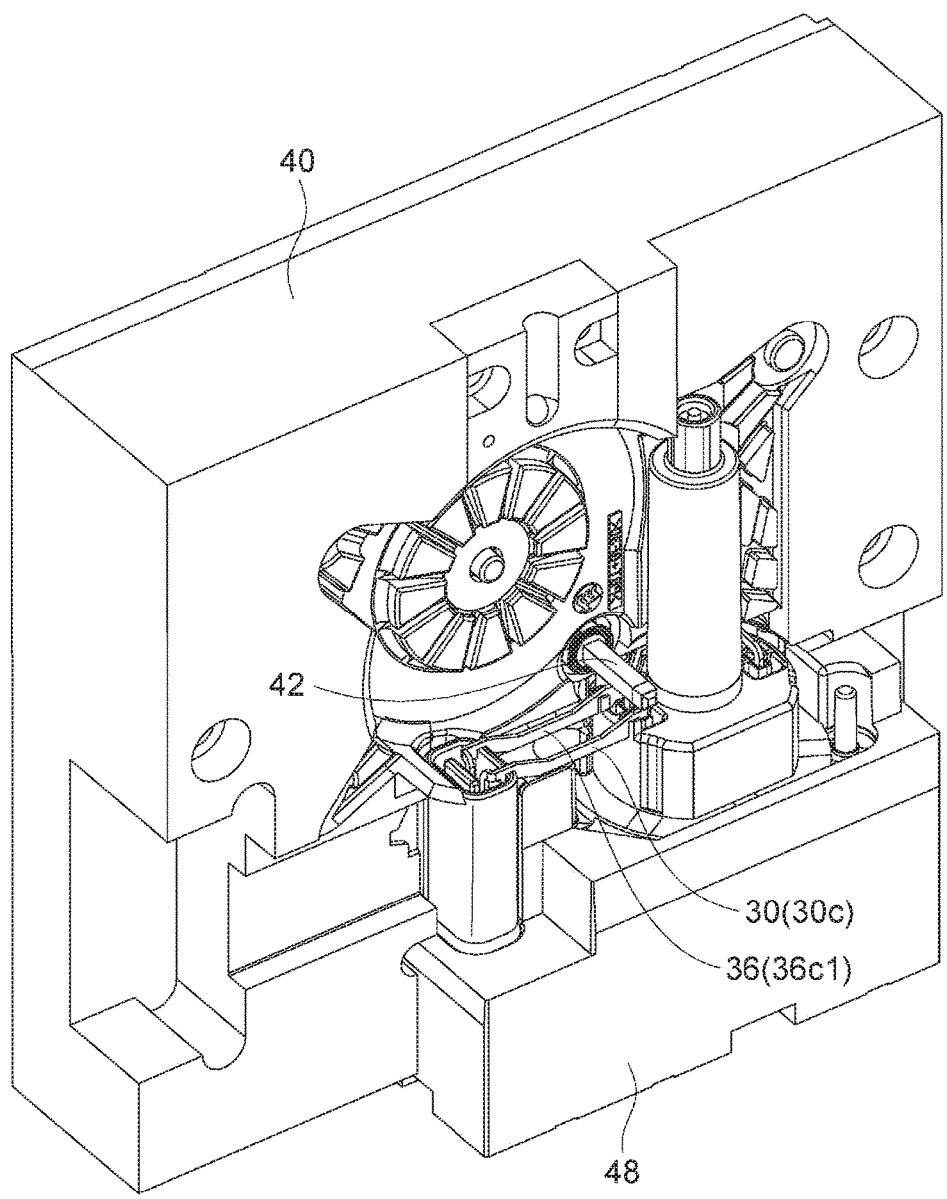
FIG. 12 shows how the insert terminals are sandwiched by the slide mold and the fixed mold.

FIG. 10 is a perspective view of the slide mold 48 from above. FIG. 11 is a perspective view of the slide mold 48 to which the two insert terminals are mounted. FIG. 12 shows how the insert terminals are sandwiched by the slide mold 48 and the fixed mold 40.

As shown in FIG. 10, three grooves 50b, 50c, and 50d, and two terminal insertion parts 50e and 50f are formed on a top surface 50a of the convex part 50 of the slide mold 48. Further, the convex part 52 includes two grooves 52b and 52c formed on the end face of the annular part, and two terminal insertion parts (not shown) formed in the cylindrical interior.

As shown in FIG. 11, the bottom of the connection part 30c of the first insert terminal 30 is supported by the grooves 50b and 52b while the pin 30a is inserted into the terminal insertion part and the sandwiching part 30b is inserted into the terminal insertion part 50f. In other words, the first insert terminal 30 is supported on one side at four locations including the two terminal insertion parts and the two grooves 50b and 52b in the slide mold 48. Further, the top of the connection part 30c of the first insert terminal 30 is supported by the aforementioned mold pin 42 when the molds are assembled (see FIG. 12). Therefore, the first insert terminal 30 will be sandwiched and fixed by the fixed mold 40 and the slide mold 48 (see FIG. 12).

The notch 36c1 of the connection part 36c of the second insert terminal 36 is supported by the grooves 50c and 52c and the folded part 36c2 is supported by the groove 50d while the pin 36a is inserted into the terminal insertion part and the sandwiching part 36b is inserted into the terminal insertion part 50e. In other words, the second insert terminal 36 is supported on one side at five locations including the two terminal insertion parts and the three grooves 50c, 50d, and 52c in the slide mold 48. Further, the top of the notch 36c1 of the second insert terminal 36 is supported by the aforementioned mold pin 42 when the molds are assembled. Therefore, the second insert terminal 36 will be sandwiched and fixed by the fixed mold 40 and the slide mold 48 (see FIG. 12).

Figure 13:
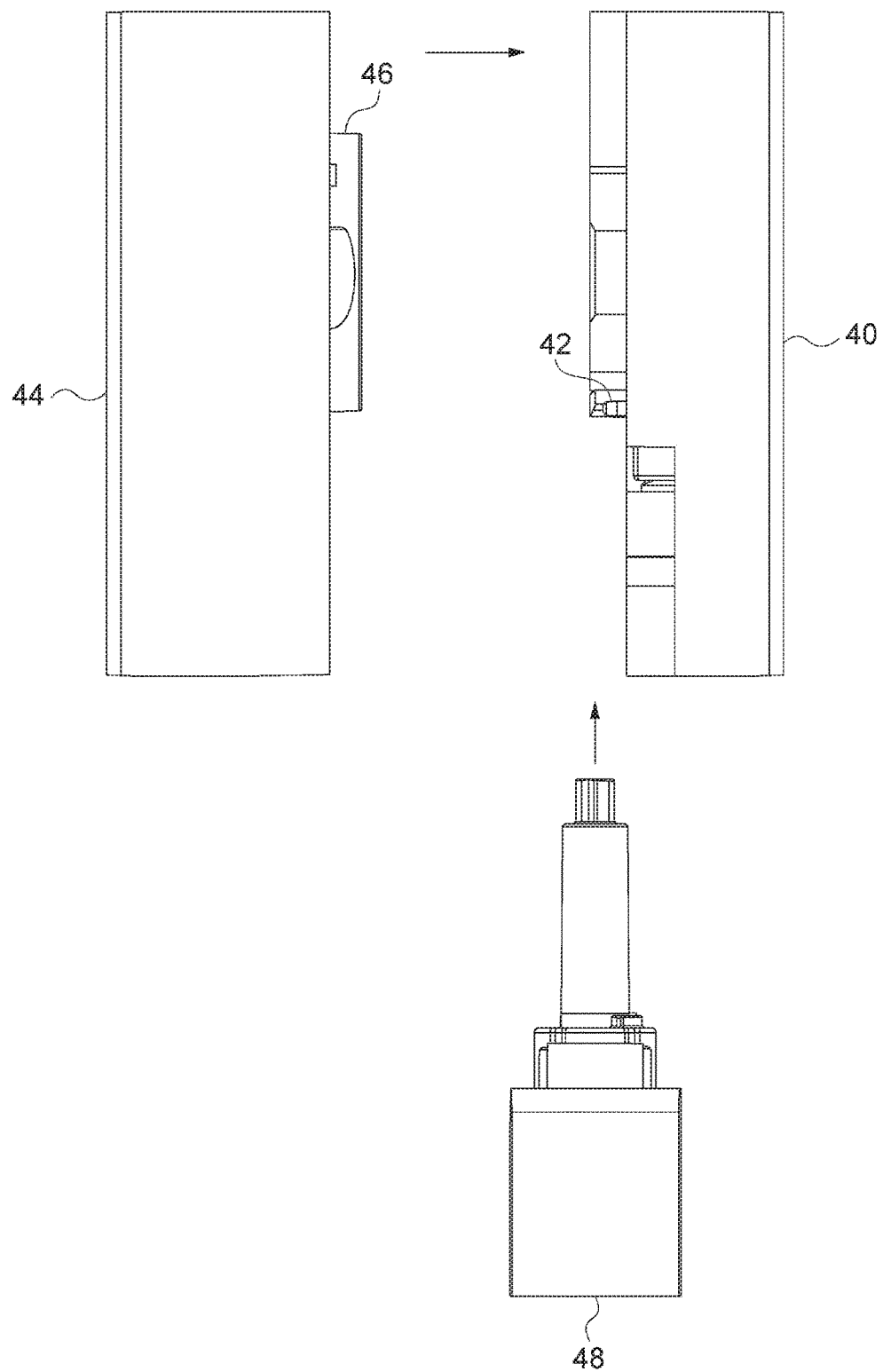
FIG. 13 shows the sequence of assembling the molds.

FIG. 13 shows the sequence of assembling the molds. The slide mold 48 and the movable mold 44 to which the insert terminals are mounted as shown in FIG. 12 are assembled to the fixed mold 40. In this state, a molten resin is injected from a gate into the cavity in the molds. The first insert terminal 30 and the second insert terminal 36 for establishing electric conduction between the two openings in the gearbox main body are integrated with the gearbox main body 18 by insert molding.

Figure 14:
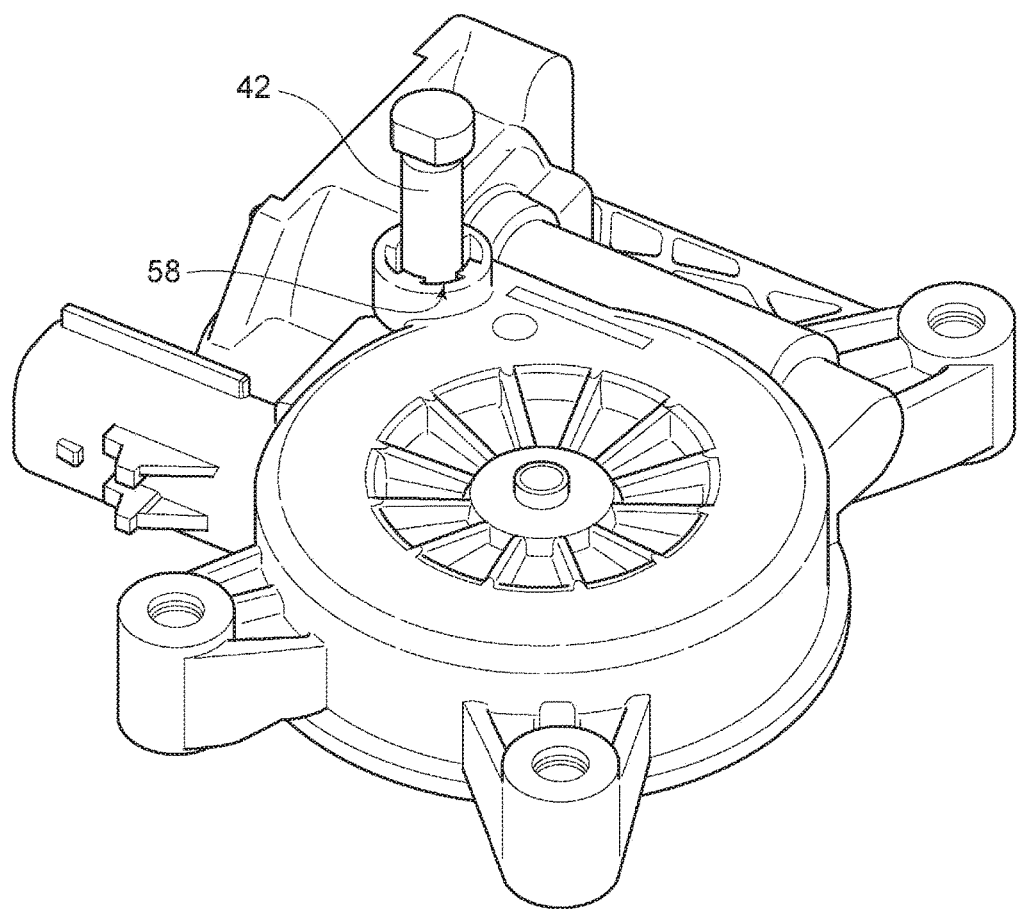
FIG. 14 shows the relative positions of the mold pin and the through hole.

As shown in FIG. 3, the gearbox 17 manufactured in this method has a through hole 58 formed by using the mold pin 42 that has maintained the positions of the terminals as the terminals are integrated with the gearbox main body 18 by insert molding. FIG. 14 shows the relative positions of the mold pin 42 and the through hole 58. The inventive assembly improves the precision of the positions of the pair of terminals 30 and 36 relative to the gearbox 17. The through hole 58 is formed by using the mold pin 42 for supporting the terminals. As a result, the gearbox 17 with a novel structure is produced.

Figure 15:
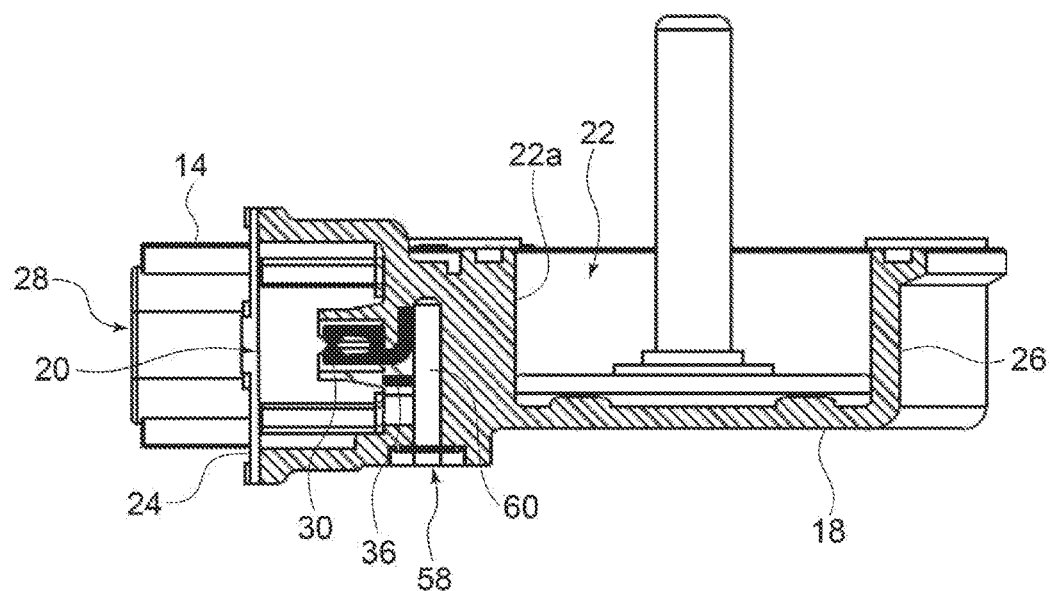
FIG. 15 is a section C-C of the gearbox shown in FIG. 3.

FIG. 15 is a section C-C of the gearbox 17 shown in FIG. 3. As shown in FIG. 15, the through hole 58 functions as a vent hole in the gearbox main body 18. This eliminates a pressure difference between the interior and exterior of the gearbox 17. Further, the through hole 58 is provided in a region between the power feeding opening 28 and the opening 20 and at a position where a difference between the pressure inside the motor mount 24 and the pressure outside the motor can be eliminated. This makes it possible to eliminate a pressure difference from a space outside the motor even in a situation in which a negative pressure develops inside the motor when the motor is stopped and is gradually cooled.

Further, the through hole 58 is provided at a position where a space 60, isolated from the worm wheel housing 22 by the inner circumferential wall 22a and formed by removing the mold pin 42 that has supported the first insert terminal 30 and the second insert terminal 36, and a space outside the motor communicate. For example, this prevents the lubricant filling the worm wheel housing 22 from contaminating the first insert terminal 30 or the second insert terminal 36.

Figure 16:
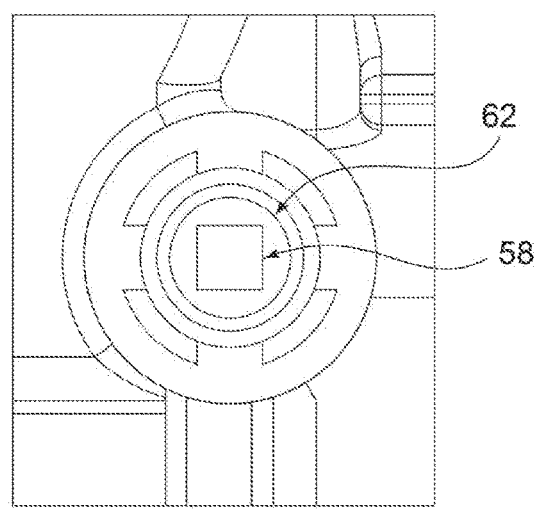
FIG. 16 is an enlarged view of the neighborhood of the through hole.

FIG. 16 is an enlarged view of the neighborhood of the through hole 58. As shown in FIG. 16, the through hole 58 is rectangular. Further, an annular concave part 62 is formed around the through hole 58 to face the front. A circular semipermeable membrane 64 as shown in FIG. 1 is mounted to the concave part 62 so as to cover the through hole 58. This reduces wrinkles formed when the circular semipermeable membrane 64 is welded to the concave part 62.

Figure 17A:
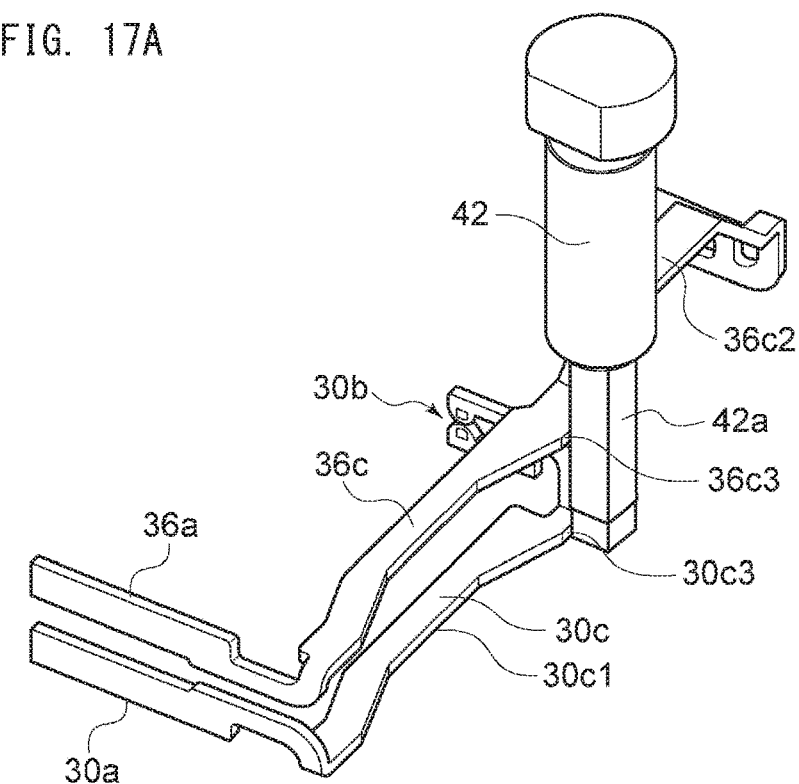
FIG. 17A is a perspective view showing how the mold pin supports the first insert terminal and the second insert terminal.
Figure 17B:
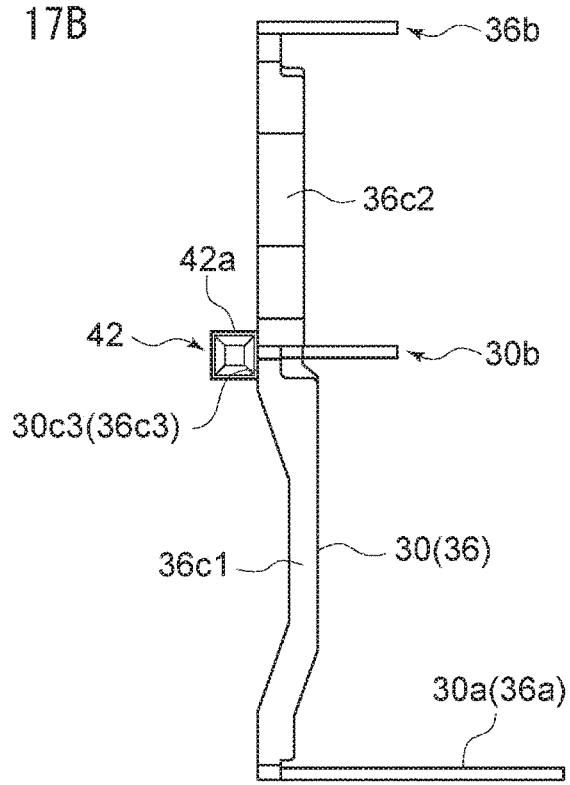
FIG. 17B shows the positions of the first insert terminal and the second insert terminal relative to the mold pin as seen from the end of the mold pin.

FIG. 17A is a perspective view showing how the mold pin 42 supports the first insert terminal 30 and the second insert terminal 36; and FIG. 17B shows the positions of the first insert terminal 30 and the second insert terminal 36 relative to the mold pin 42 as seen from the end of the mold pin 42.

As shown in FIGS. 17A and 17B, the end of the mold pin 42 is configured as a quadrangular prism 42a. One of the side surfaces of the quadrangular prism 42a holds a side surface 30c3 of the connection part 30c of the first insert terminal 30 and a side surface 36c3 of the connection part 36c of the second insert terminal 36 so that the first insert terminal 30 and the second insert terminal 36 are not lifted above the slide mold 48 when the molds are assembled.

In other words, the through hole 58 is formed to correspond to the mold pin 42 that has maintained the positions of the first insert terminal 30 and the second insert terminal 36. This allows the terminals to be commonly positioned by using the mold pin 42. The part of the mold pin 42 in contact with the terminals may be polygonal instead of quadrangular. So long as the part in contact with the terminals is planar, the other parts may be curved.

The gearbox 17 according to the embodiment is configured such that the minimum distance d between the first insert terminal 30 or the second insert terminal 36 and the through hole 58 is 0.5 mm or less when the gearbox main body 18 is seen in the axial direction of the rotation axis of the worm wheel. This ensures high precision of the positions of the terminals formed in the gearbox main body 18 by insert molding. This means that the amount of projection of the pins 30a and 36a from the connection part 34 is controlled to be within a desired range.

The features of the embodiment can be covered by a method of manufacturing a gearbox. The method is directed to manufacturing the gearbox 17 in which the gearbox main body 18 of the speed reducer 12 to which the motor 10 is mounted is manufactured by integral molding, using a mold. The first insert terminal 30 and the second insert terminal 36 for establishing electric conduction between the opening 20 and the power feeding opening 28 of the gearbox main body 18 are integrated with the gearbox main body 18 by insert molding such that the first insert terminal 30 and the second insert terminal 36 are sandwiched and fixed by the fixed mold 40 and the slide mold 48 (see FIG. 12).

This makes it unnecessary to arrange the first insert terminal 30 and the second insert terminal 36 in the gearbox main body 18 after the gearbox main body 18 is molded so that the manufacturing process is simplified. This also prevents the terminals 30 and 36 from being lifted by the resin that flows during insert molding.

In further accordance with the embodiment, the through hole 58 is formed to correspond to the mold pin 42 of the fixed mold 40, which is one of the plurality of molds. This allows the terminals to be positioned and the through hole 58 to be formed, by using a common mold.

The plurality of molds used include the slide mold 48 to which the terminals 30 and 36 are mounted, the fixed mold 40 for forming an outer circumferential wall 26 of the worm wheel housing 22 in which the worm wheel of the speed reducer 12 is housed, and the movable mold 44. The terminals are insert molded so that the terminals mounted to the slide mold 48 are not in contact with the cylindrical convex part 46 of the movable mold 44 corresponding to the worm wheel housing 22. This prevents the terminals from being exposed inside the worm wheel housing 22 so that the water proof and insulation performance is improved.

The embodiments of the present invention are not limited to those described above and appropriate combinations or replacements of the features of the embodiments are also encompassed by the present invention. The embodiments may be modified by way of combinations, rearranging of the processing sequence, design changes, etc., based on the knowledge of a skilled person, and such modifications are also within the scope of the present invention.

The invention claimed is:

1. A gearbox comprising:
a gearbox main body made of resin that constitutes a part of a speed reducer to which a motor is mounted; and
a terminal that conducts power supplied from an external source to the motor, wherein
the gearbox main body includes a through hole formed to correspond to a mold that is used to maintain a position of the terminal while the terminal is being integrated with the gearbox main body by insert molding.

2. The gearbox according to claim 1, wherein
the through hole functions as a vent hole in the gearbox main body.

3. The gearbox according to claim 2, wherein the gearbox main body includes:
a worm wheel housing that houses a worm wheel of the speed reducer;
a motor mount formed with an opening through which a worm fixed to a motor shaft is inserted and having the motor mounted thereto; and
a power feeding opening to which an external terminal is connected, wherein
the terminal constitutes a power feeding channel between the motor mount and the power feeding opening, and
the through hole is provided in a region adjacent to the motor mount and at a position where a difference in a pressure inside the motor mount and a pressure outside the motor is eliminated.

4. The gearbox according to claim 3, wherein
the through hole is provided at a position where a space isolated from the worm wheel housing by a wall and formed by removing a mold member used to support the terminal and a space outside the motor communicate.

5. The gearbox according to claim 2, further comprising:
a semipermeable membrane provided to cover the through hole, wherein the through hole is polygonal,
an annular concave part is formed around the through hole to face the front, and
the semipermeable membrane is mounted to the concave part.

6. The gearbox according to claim 1, wherein
the terminal includes a first terminal and a second terminal, and
the through hole is formed to correspond to a mold member used to maintain positions of the first terminal and the second terminal.

7. The gearbox according to claim 1, wherein
the gearbox is configured such that a minimum distance between the through hole and the terminal is 0.5 mm or less when the gearbox main body is seen in an axial direction of a rotation axis of the worm wheel.

8. A motor with a speed reducer, comprising:
the gearbox according to claim 1;
a worm wheel; and
a motor in which a worm in mesh with the worm wheel is fixed to a shaft.

9. A method of manufacturing a gearbox whereby a gearbox main body of a speed reducer to which a motor is mounted is manufactured by integral molding, using a mold,
wherein a terminal for establishing electric conduction between two openings of the gearbox main body is integrated with the gearbox main body by insert molding such that the terminal is sandwiched and fixed by a plurality of molds,
wherein the plurality of molds include a mount mold for mounting the terminal and a housing mold for forming a side wall of a worm wheel housing for housing a worm wheel of the speed reducer, and the terminal is insert molded so that terminal mounted to the mount mold is not in contact with a part of the housing mold that corresponds to the worm wheel housing.

10. The method of manufacturing a gearbox according to claim 9, wherein a vent hole is formed to correspond to one of the plurality of molds.

* * * * *